United States Patent Office

3,242,093
Patented Mar. 22, 1966

3,242,093
COMPOSITION FOR REMOVING SURFACE OXIDATION FROM METAL SURFACES
Walter Ames Compton, Elkhart, Ind., assignor to Miles Laboratories, Inc., Elkhart, Ind., a corporation of Indiana
No Drawing. Filed Oct. 7, 1963, Ser. No. 314,514
3 Claims. (Cl. 252—142)

This invention relates to a novel composition for removing rust and corrosion from metallic objects. More specifically, the invention concerns a water-soluble composition which is useful for removing rust and corrosion from metallic objects and for protecting the cleaned surface from subsequent rusting and corrosion.

Before using any of the known rust removing compositions, several variables must be considered, for example, the type of material to be cleaned, the contaminant to be removed, how tightly the contaminant adheres, and what, if any, further treatments are planned. Metal tools and the like to be cleaned usually have layers of rust, scale, and/or soil composed of oil, grease and dirt on their surfaces. Utilizing the known cleaners, it is almost always necessary to preclean the metal surface to remove the bulk of the undesirable materials prior to removing the rust and/or corrosion. These precleaning techniques are often complicated, time consuming and quite often require the use of highly toxic chemicals which would not be suitable for domestic or household use.

In any rust or corrosion removal technique, whether it be in industry or in the household, mildness, non-toxicity and efficiency are the most important considerations. The domestic consumer is primarily interested in a non-hazardous and efficient cleaner for removing rust from tools, garden implements, tire chains, and other metallic items usually found in and around the home which are prone to atmospheric oxidation and corrosion. Industry, on the other hand, is concerned with the use of a safe cleaner to avoid exposure of personnel and equipment to such dangerous materials as the strong acids and alkalis presently used.

Accordingly, a primary object of this invention is to provide a highly effective composition for the removal of rust or corrosion from metallic objects which does not require precleaning of the metal to be effective.

Another object is to provide a composition of the aforementioned character which is water-soluble, non-toxic and mild.

Still another object is to provide a composition which will not only effectively remove rust and corrosion from metallic objects, but will also protect the cleaned surface from subsequent rusting or corrosion.

Yet another object is to provide a composition for effectively removing rust or corrosion scale from metallic objects, which composition will not attack or otherwise deleteriously affect the base metal of the object being treated.

Another object of this invention is to provide a composition in tablet form which is highly effective for removing rust or corrosion from metallic objects.

A preferred embodiment of the present invention comprises a water-soluble composition consisting of diammonium citrate, sodium bicarbonate, citric acid and a solid, water-soluble, non-ionic surfactant. The diammonium citrate, citric acid and sodium bicarbonate ingredients used are well known commercially available compounds.

Although it is preferred to use a surfactant having the aforementioned properties in the composition of this invention, the surfactant is not indispensible to the composition in that it does not enter into the reaction which occurs in the removal of rust or corrosion from metals. The surfactant serves a very useful purpose, however, in that it enables the composition to more effectively penetrate the rust or corrosion scale. Suitable solid, non-ionic surfactants which may be used in the present composition include a series of high molecular weight non-ionic surfactants marketed under the trademark Pluronics and prepared by condensing ethylene oxide with a hydrophobic base formed by condensation of propylene oxide with propylene glycol. A preferred product is a solid, non-ionic surfactant marketed under the trademark Pluronic F-68, in which the hydrophobic polyoxypropylene base comprises about 20% by weight of the total molecule and the hydrophilic polyoxyethylene groups comprise about 80% by weight of the total molecule. Although the aforementioned products are the preferred surfactants utilized in the novel composition of this invention, any of the present commercially available solid, non-ionic surfactants which have properties similar to the Pluronics would be operable. Such properties include stability to acids, alkalis and most metallic ions, non-corrosivity, excellent detergent properties, high wetting speed, and good suspending properties.

For convenience and ease in handling, it is preferred to prepare the composition of this invention in tablet form. In a preferred embodiment the dry ingredients are compressed into tablets weighing approximately four (4) grams each. While the ratio of the ingredients is effective within wider ranges, I have found that a composition comprising, by weight, from about 0.5 to 5 parts diammonium citrate, 2.0 to 10.0 parts sodium bicarbonate, 2.5 to 10.0 parts citric acid, and 0.25 to 2.0 parts of a solid, water-soluble, non-ionic surfactant, is highly effective in removing rust or corrosion from metallic surfaces such as iron, steel, lead, tin, copper, zinc, aluminum, bronze and the like.

A preferred formulation comprises a four (4) gram tablet consisting of the following ingredients, said ingredients being specified in parts by weight.

| | Parts |
|---|---|
| Diammonium citrate | 2 |
| Sodium bicarbonate | 7 |
| Citric acid | 7 |
| Surfactant (Pluronic F-68) | 1 |

In the practice of this invention a four (4) gram tablet of the composition listed above is dissolved at room temperature in from about 120 cc. to 240 cc. of water and the rusted or corroded object is immersed in the water solution. For treatment of larger objects a larger quantity of water sufficient for immersion and a correspondingly increased number of tablets are used to provide the treating solution. After allowing the objects to remain in the solution for from about 12 hours to 72 hours it is then removed, cleansed with tap water and wiped dry. Surprisingly, this treatment imparts to the previously rusted or corroded surface of the metal article a finish nearly identical to the finish said surface had prior to rusting or corrosion.

In addition to effectively removing rust or corrosion from metallic surfaces, I have found that the composition of this invention provides an excellent protective coating which prevents subsequent atmospherically induced rusting or corrosion of the cleaned surface for extended periods of time. No treatment beyond cleansing in ordinary tap water followed by drying of the metallic object is required to render this protective coating effective.

It is noted that upon immersion of a rusted or corroded object into the solution a reaction commences immediately, as indicated by the evolution of minute bubbles at the surface of the rusted or corroded area. The bubbles are released continuously until the entire covering of rust or corrosion is completely removed, whereupon the evolution of bubbles ceases. It is further observed that the article, once cleaned, can be left in the solution for several days without any erosion or etching of the cleaned base metal. This feature is a specific advantage of the composition of this invention over the known compositions, and is particularly important to the homeowner, since the corrosive activity of the prior art solutions upon articles left therein beyond the required cleaning period tends to cause damage to the surface of such articles.

Although the chemical reaction by which the novel composition of this invention effectively removes rust or corrosion from metallic surfaces is not completely understood, it is believed that the diammonium citrate and the sodium citrate, formed from the reaction of citric acid and sodium bicarbonate, react simultaneously with the metal ions in the scale (metallic oxides) present on the surfaces of rusted or corroded metals to form chelate compounds. The chelate compounds thus formed are water-soluble, complex compounds which are readily removed from the metallic surface by washing with tap water following removal of said surface from the cleaning solution.

In addition to forming sodium citrate by reaction with citric acid, the sodium bicarbonate of the present composition serves the further very useful function of maintaining the hydrogen ion concentration of the solution at a level which is sufficiently high to prevent the solution from having any substantial corrosive effect on the base metal underlying the rust or corrosion scale. As indicated below, the pH of the solution of Example I is about 5.5. Without the sodium bicarbonate, however, the pH of said solution would be from about 1.5 to about 3.0 due to the acidity of the citric acid, and such a solution would have a tendency to attack the base metal. As will be shown hereinafter, it has also been observed that the combination of diammonium citrate with citric acid and sodium bicarbonate in the present composition produces a synergistic effect imparting to the composition superior rust and corrosion removal characteristics.

The following examples serve to illustrate the present invention, but are not to be construed in a limitative sense.

EXAMPLE I

The preferred formulation consists of a four (4) gram tablet containing the following ingredients, said ingredients being specified in parts by weight:

Formulation: Parts
  Diammonium citrate _____ 2
  Sodium bicarbonate _____ 7
  Citric acid _____ 7
  Surfactant (Pluronic F-68) _____ 1

A cleaning solution was prepared by dissolving the four (4) gram tablet in 200 cc. of distilled water at room temperature. The pH of the solution was about 5.5. Into this solution was immersed a badly rusted flat sheet of cold rolled steel approximately ⅛ in. thick and having approximately 6 sq. in. total surface area. After 24 hours immersion in the solution all of the rust scale had been removed from the steel sheet and the cleaned finish closely assembled the appearance of the finish prior to rusting.

In order to determine the corrosive activity of the cleaning solution of this invention on metal articles left in the solution beyond the period required for removal of rust or oxide scale, the aforementioned cleaned steel sheet was weighed and then reimmersed in a freshly-prepared celaning solution, prepared as above. The steel sheet was left in the cleaning solution for 192 hours (8 days), then removed, dried and weighed again. The net loss of metal during the 192 hr. period, which is designated for purposes of this invention as the corrosion rate of the metal, was then calculated as the weight of metal lost( in pounds) per unit of surface area of metal (in square feet) per day (24 hours). The results, indicating a negligible corrosion rate, are set out in Table I below.

*Table 1*

CORROSION RATE OF STEEL (IRON)

| Metal | Weight of metal | | Net loss of metal after 192 hours (grams) | Rate of corrosion of metal (lbs./sq. ft./day). |
|---|---|---|---|---|
| | Prior to immersion in cleaning solution (grams) | After immersion for 192 hours (grams) | | |
| Sheet steel | 40.225 | 40.170 | 0.055 | 0.00035 |

EXAMPLE II

A cleaning solution was prepared utilizing the formulation of Example I in the same manner as described in Example I. Into this solution was immersed a flat sheet of lead approximately ⅛ in. thick and having approximately 4.5 sq. in. total surface area, which piece was coated with an oxide scale. After 24 hours immersion in the solution all of the oxide scale had been removed from the surface of the lead piece and the cleansed finish closely resembled the appearance of the finish prior to oxidation.

The corrosive activity of the cleaning solution of this invention on the cleaned lead piece when left in the solution beyond the period required for removal of the oxide scale was determined according to the procedure of Example I. A negligible corrosion rate of 0.0011 lbs./sq. ft./day was calculated from the results thereof.

EXAMPLE III

A cleaning solution was prepared utilizing the formulation of Example I in the same manner as described in Example I. Into this solution was immersed a flat sheet of tin approximately ⅛ in. thick and having approximately 8 sq. in. total surface area, which sheet was coated with an oxide scale. After 24 hours immersion in the solution all of the oxide scale had been removed from the surface of the tin piece and the cleaned finish closely resembled the appearance of the finish prior to oxidation.

The corrosive activity of the cleaning solution of this invention on the cleaned tin piece when left in the solution beyond the period required for removal of the oxide scale was determined according to the procedure of Example I. A negligible corrosion rate of 0.00024 lbs./sq. ft./day was calculated from the results thereof.

EXAMPLE IV

A cleaning solution was prepared utilizing the formulation of Example I in the same manner as described in Example I. Into this solution was immersed a flat sheet of copper approximately ⅛ in. thick and having approximately 5.0 sq. in. total surface area, which piece was coated with an oxide scale. After 24 hours immersion in the solution all of the scale had been removed from the surface of the copper piece and the cleaned finish closely resembled the appearance of the finish prior to oxidation.

The corrosive activity of the cleaning solution of this invention on the cleaned copper piece when left in the solution beyond the period required for removal of the oxide scale was determined according to the procedure of Example I. A negligible corrosion rate of 0.00009 lbs./sq. ft./day was calculated from the results thereof.

EXAMPLE V

A cleaning solution was prepared utilizing the formulation of Example I in the same manner as described in Example I. Into this solution was immersed a flat sheet of zinc approximately ⅛ in. thick and having approximately 7.1 sq. in. total surface area, which piece was coated with an oxide scale. After 24 hours immersion in the solution all of the oxide scale had been removed from the surface of the zinc piece and the cleaned finish closely resembled the appearance of the finish prior to oxidation.

The corrosive activity of the cleaning solution of this invention on the cleaned zinc piece when left in the solution beyond the period required for removal of the oxide scale was determined according to the procedure of Example I. A negligible corrosion rate of 0.0011 lbs./sq. ft./day was calculated from the results thereof.

EXAMPLE VI

A cleaning solution was prepared utilizing the formulation of Example I in the same manner as described in Example I. Into this solution was immersed a flat sheet of aluminum approximately 1/8 in. thick and having approximately 2 sq. in. total surface area, which piece was coated with an oxide scale. After 24 hours immersion in the solution all of the scale had been removed from the surface of the aluminum piece and the cleaned finish closely resembled the appearance of the finish prior to oxidation.

The corrosive activity of the cleaning solution of this invention on the cleaned aluminum piece when left in the solution beyond the period required for removal of the oxide scale was determined according to the procedure of Example I. A negligible corrosion rate of less than 0.00001 lbs./sq. ft./day was calculated from the results thereof.

EXAMPLE VII

A cleaning solution was prepared utilizing the formulation of Example I in the same manner as described in Example I. Into this solution was immersed a flat sheet of bronze 1/8 in. thick and having approximately 2.5 sq. in. total surface area, which piece was coated with an oxide scale. After 24 hours immersion in the solution all of the scale had been removed from the surface of the bronze piece and then cleaned finish closely resembled the appearance of the finish prior to oxidation.

The corrosive activity of the cleaning solution of this invention on the cleaned bronze piece when left in the solution beyond the period required for removal of the oxide scale was determined according to the procedure of Example I. A negligible corrosion rate of less than 0.00001 lbs./sq. ft./day was calculated from the results thereof.

The almost negligible amount of erosion or etching of metals left in the cleaning composition of this invention beyond the period of time required for removing rust or oxide scale from such metals, as shown in the corrosion data of the foregoing examples, graphically illustrates a distinct advantage of the present composition over some of the prior art compositions which are known to corrode articles left in such solutions beyond the required cleaning period. Another advantage of the present cleaning composition is to be found in its provision of a protective coating on the cleaned metal surfaces which resists atmospherically-induced rusting or corrosion of such surfaces for extended periods of time. In this regard it was noted that no visible rusting or oxidation of the cleaned metal pieces of the foregoing examples had occurred after the metal pieces had been exposed to ordinary room atmospheric conditions for a period of 60 days.

The following examples illustrate the synergistic effect of the combination of diammonium citrate with the citric acid and sodium bicarbonate in the cleaning composition of this invention in effectively removing rust or corrosion from metals. In these examples a comparison is made between the ability of diammonium citrate per se and the composition of the present invention (containing diammonium citrate, citric acid and sodium bicarbonate) to form a water-soluble, chelate complex with magnetic iron oxide ($Fe_3O_4$).

EXAMPLE VIII

A cleaning solution was prepared by dissolving 5.0 g. of diammonium citrate in 200 cc. of distilled water at room temperature. The resulting solution had a pH of about 5.0. To this solution was added 1.0 g. of dry magnetic iron oxide ($Fe_3O_4$) and the resulting mixture was allowed to stand for 24 hours. At the end of the 24 hour period the solution was then filtered and the solid $Fe_3O_4$ which collected on the filter was dried and re-weighed. The weight of the dry material was 1.0 g., which indicated that none of the $Fe_3O_4$ had been complexed by the diammonium citrate.

Several additional cleaning solutions were prepared as described above in which the hydrogen ion concentration was adjusted on the alkaline side by addition of varying amounts of ammonium hydroxide to the respective solutions prior to addition of $Fe_3O_4$. The respective solutions had pH ranges of 6.0, 7.0, 8.0 and 9.0. To each of the aforementioned solutions was added 1.0 g. of $Fe_3O_4$ and the resulting mixture was allowed to stand for 24 hours. At the end of the 24 hour period the solutions were filtered and the solid $Fe_3O_4$ which collected on the filter was dried and re-weighed. In each instance the dry weight of $Fe_3O_4$ collected by filtration was only slightly less than 1.0 gram, which indicated that the amount of $Fe_3O_4$ complexed by the diammonium citrate was virtually negligible.

EXAMPLE IX

A cleaning solution was prepared by dissolving a four (4) gram tablet of the preferred composition of this invention, as set out in Example I, in 200 cc. of water at room temperature. The resulting solution had a pH of about 5.5. To this solution was added 0.5 g. of dry magnetic iron oxide ($Fe_3O_4$) and the resulting mixture was allowed to stand for 24 hours. At the end of the 24 hour period the solution was then filtered and the solid $Fe_3O_4$ which collected on the filter was dried and re-weighed. The weight of the dry material was 0.349 g., thus indicating that 0.151 g. of $Fe_3O_4$ had been complexed by the diammonium citrate-citric acid combination of the present composition.

Assuming that the diammonium citrate-citric acid combination of the present composition forms a water-soluble complex with $Fe_3O_4$ on an equimolar basis, the theoretical amount of $Fe_3O_4$ which should dissolve in the water is approximately 0.156 g. As the above data indicates the diammonium citrate-citric acid combination of the present composition was found to complex 0.151 g. of $Fe_3O_4$, or nearly 100% of theory.

In summary, the present invention relates to a composition for removing rust or corrosion from metallic articles such as iron, steel, lead, tin, copper, zinc, aluminum, bronze and the like. The preferred embodiment comprises a water-soluble composition, in tablet form, consisting of 2 parts diammonium citrate, 7 parts sodium bicarbonate, 7 parts citric acid and 1 part of a solid, water-soluble, non-ionic surfactant.

What is claimed is:

1. A water-soluble, metal treating composition consisting essentially of from about 0.5 to 5.0 parts diammonium citrate, 2.5 to 10.0 parts citric acid, 2.0 to 10.0 parts sodium bicarbonate and 0.25 to 2.0 parts of a solid, water-soluble, non-ionic polyoxypropylene-polyoxyethylene surfactant, said parts being by weight.

2. A water-soluble, metal treating composition consisting essentially of about 2.0 parts diammonium citrate, about 7 parts citric acid, about 7 parts sodium bicarbonate and about 1 part of a solid, water-soluble, non-ionic polyoxypropylene-polyoxyethylene surfactant, said parts being by weight.

3. A water-soluble composition for removing surface oxidation from the surface of a metallic object formed of a metal selected from the group consisting of iron, steel, lead, tin, copper, zinc, aluminum and bronze, said composition consisting essentially of about 2.0 parts diammonium citrate, about 7 parts citric acid, about 7 parts sodium bicarbonate and about 1 part of a solid, water-soluble, non-ionic polyoxypropylene-polyoxyethylene surfactant, said parts being by weight.

References Cited by the Examiner

UNITED STATES PATENTS

| | | | |
|---|---|---|---|
| 1,523,741 | 1/1925 | Yonkman | 252—142 |
| 1,554,483 | 9/1925 | Bailey et al. | 134—28 |
| 2,169,344 | 2/1936 | Kimball | 252—121 |
| 2,497,057 | 2/1950 | Pape et al. | 252—142 |
| 2,978,026 | 4/1961 | Bemis | 252—142 XR |
| 3,081,267 | 3/1963 | Laskey | 252—137 XR |

FOREIGN PATENTS 896,159   5/1962   Great Britain.

OTHER REFERENCES

Rose: The Condensed Chemical Dictionary, 5th Ed. (1956), Rheinhold Publishing Co., p. 71.

"Pluronics in Metal Cleaning Formulations," (1958), Wyandotte Chemicals Corp., p. 10.

JULIUS GREENWALD, *Primary Examiner.*